US012652542B2

(12) United States Patent (10) Patent No.: US 12,652,542 B2

Cuevas Ramirez (45) Date of Patent: Jun. 9, 2026

(54) METHOD OF OPERATING A TELECOMMUNICATIONS NETWORK

(71) Applicant: BRITISH TELECOMMUNICATIONS PUBLIC LIMITED COMPANY, London (GB)

(72) Inventor: Maria Cuevas Ramirez, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/832,803

(22) PCT Filed: Dec. 16, 2022

(86) PCT No.: PCT/EP2022/086348

§ 371 (c)(1),
(2) Date: Jul. 24, 2024

(87) PCT Pub. No.: WO2023/143809

PCT Pub. Date: Aug. 3, 2023

(65) Prior Publication Data

US 2025/0097713 A1 Mar. 20, 2025

(30) Foreign Application Priority Data

Jan. 27, 2022 (ES) ................................ ES202230061

(51) Int. Cl.
G06F 15/16 (2006.01)
G06F 9/54 (2006.01)
(Continued)

(52) U.S. Cl.
CPC ........... H04W 12/40 (2021.01); H04L 61/106 (2013.01)

(58) Field of Classification Search
CPC ..... H04W 12/40; H04W 12/72; H04W 88/06; H04W 12/69; H04L 61/106; H04L 43/02
(Continued)

(56) References Cited

U.S. PATENT DOCUMENTS 8,320,344 B2 * 11/2012 Hodroj .................. H04W 4/029
370/338
9,124,585 B1 * 9/2015 Yen ........................ H04L 61/103
(Continued)

FOREIGN PATENT DOCUMENTS

CA 2381612 A1 * 3/2001 ............ H04W 76/25
FR 2861241 A1 * 4/2005 ............ H04W 48/18
(Continued)

OTHER PUBLICATIONS

International Search Report and Written Opinion of the ISA for PCT/EP2022/086348 dated Mar. 29, 2023, 8 pages.
(Continued)

*Primary Examiner* — Hamza N Algibhah
(74) *Attorney, Agent, or Firm* — Nixon & Vanderhye P.C.

(57) ABSTRACT

A method (200) of operating a telecommunications network (100), said telecommunications network comprising a cellular telecommunications network (100-1) and a non-cellular telecommunications network (100-2), wherein both of said networks are accessible to a User Equipment (110), UE, the method comprising the steps of: establishing a network connection between the UE and the cellular telecommunications network via the non-cellular telecommunications network (210); obtaining, by means of the cellular telecommunications network, a: unique cellular subscriber identity associated with the UE and for accessing the cellular telecommunications network; and network address associated with the UE and for use with the non-cellular telecommunications network for the network connection (220); gener-
(Continued)

ating an identifier for identifying the UE to the non-cellular telecommunications network (230); generating, by means of the cellular telecommunications network, a mapping between the: identifier; unique cellular subscriber identity; and the network address; and receiving, at the non-cellular telecommunications network, based on the generated mapping, the identifier in association with the network address (240).

17 Claims, 2 Drawing Sheets

(51) Int. Cl.
| | | |
|---|---|---|
| *H04L 29/06* | (2006.01) | |
| *H04L 61/106* | (2022.01) | |
| *H04W 12/40* | (2021.01) | |

(58) Field of Classification Search
USPC ............................................................. 726/7
See application file for complete search history.

(56) References Cited

U.S. PATENT DOCUMENTS

| | | | | |
|---|---|---|---|---|
| 9,363,740 | B2 * | 6/2016 | Linkola ................. | H04W 48/16 |
| 10,820,202 | B1 * | 10/2020 | Gundavelli ......... | H04W 12/069 |
| 11,871,461 | B2 * | 1/2024 | Liao ...................... | H04W 60/00 |
| 2006/0128362 | A1 * | 6/2006 | Bae ....................... | H04W 12/06 |
| | | | | 455/411 |
| 2006/0209768 | A1 * | 9/2006 | Yan ....................... | H04W 76/12 |
| | | | | 370/338 |

| | | | | |
|---|---|---|---|---|
| 2008/0304458 | A1 * | 12/2008 | Aghvami ................ | H04L 69/08 |
| | | | | 370/338 |
| 2011/0081890 | A1 * | 4/2011 | Ahmadvand ......... | H04W 88/10 |
| | | | | 455/411 |
| 2014/0086211 | A1 * | 3/2014 | Liu ........................ | H04W 36/22 |
| | | | | 370/331 |
| 2014/0146806 | A1 * | 5/2014 | Liu ......................... | H04W 8/18 |
| | | | | 370/338 |
| 2015/0223062 | A1 * | 8/2015 | Buchmayer ............. | H04W 8/06 |
| | | | | 370/338 |
| 2020/0014561 | A1 * | 1/2020 | Koat ................... | H04L 63/0876 |
| 2020/0015079 | A1 | 1/2020 | Li et al. | |
| 2021/0036988 | A1 | 2/2021 | Mckibben et al. | |
| 2021/0360742 | A1 * | 11/2021 | Liao ..................... | H04W 60/00 |
| 2021/0400485 | A1 * | 12/2021 | Ergen .................. | G06F 16/9537 |
| 2022/0070172 | A1 * | 3/2022 | Muthusamy .......... | H04L 63/108 |

FOREIGN PATENT DOCUMENTS

| | | | | |
|---|---|---|---|---|
| WO | WO-2010009446 A1 * | 1/2010 | ........... | H04W 12/08 |
| WO | 2017000620 A1 | 1/2017 | | |
| WO | 2017003357 A1 | 1/2017 | | |
| WO | WO-2021021956 A1 * | 2/2021 | ........... | H04L 63/123 |

OTHER PUBLICATIONS

Combined Search and Examination Report for GB Application No. 2202810.4 dated Oct. 3, 2022, 10 pages.
International Preliminary Report on Patentability dated Aug. 8, 2024, issued for International Application No. PCT/EP2022/086348 (10 pages).

* cited by examiner

100

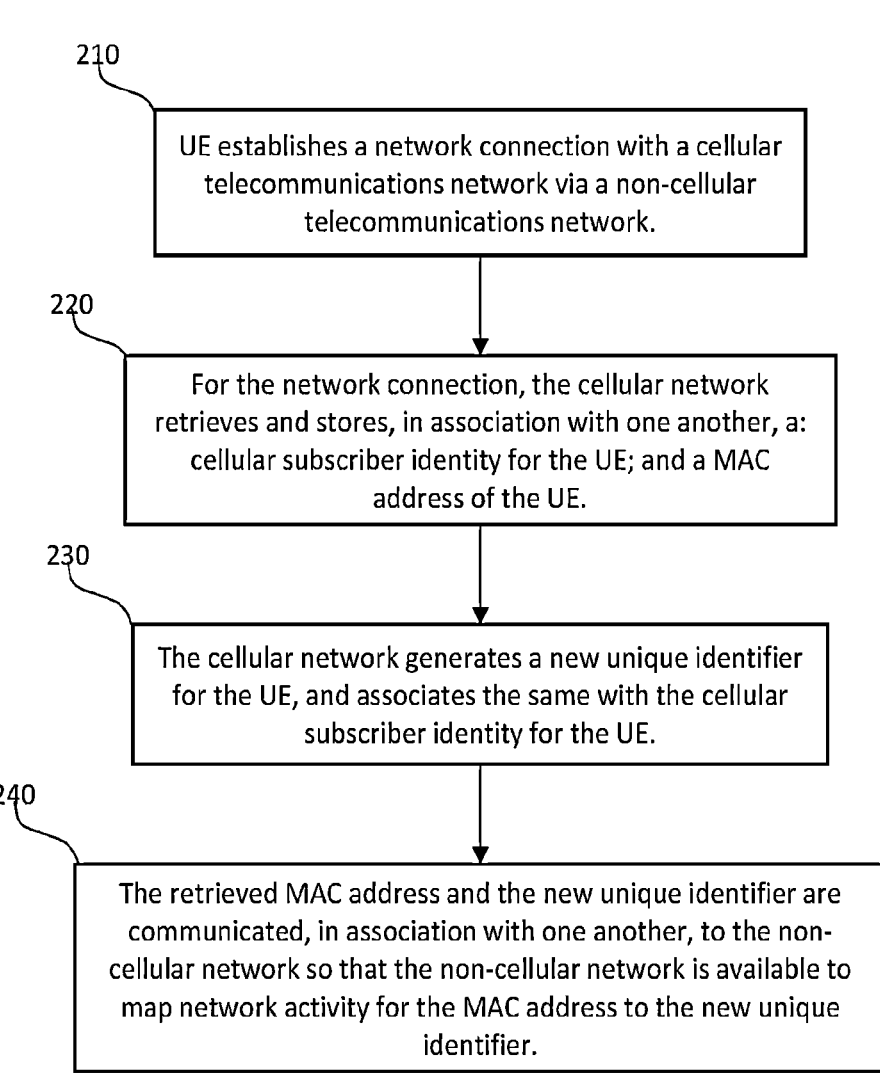

210

UE establishes a network connection with a cellular telecommunications network via a non-cellular telecommunications network.

220

For the network connection, the cellular network retrieves and stores, in association with one another, a: cellular subscriber identity for the UE; and a MAC address of the UE.

230

The cellular network generates a new unique identifier for the UE, and associates the same with the cellular subscriber identity for the UE.

240

The retrieved MAC address and the new unique identifier are communicated, in association with one another, to the non-cellular network so that the non-cellular network is available to map network activity for the MAC address to the new unique identifier.

Figure 2

METHOD OF OPERATING A TELECOMMUNICATIONS NETWORK

CROSS-REFERENCE TO RELATED APPLICATIONS

This application is the U.S. national phase of International Application No. PCT/EP2022/086348 filed Dec. 16, 2022 which designated the U.S. and claims priority to ES P 202230061 filed Jan. 27, 2022, the entire contents of each of which are hereby incorporated by reference.

FIELD OF INVENTION

The present invention relates to a telecommunications network and to method of operating said network.

BACKGROUND

A Media Access Control (MAC) network address may be used to identify a telecommunications device accessing a telecommunications network, and in turn to associate network activity with that device.

However, for privacy, the telecommunications device may, unbeknownst to the telecommunications network, occasionally modify its MAC address (e.g. according to so-called "MAC randomisation") so as to reset the volume of network activity the telecommunications network associates with any single network device. In this way, the network device effectively prevents continuity of identity, as determined by the telecommunications network, with each modification of the MAC address.

Under such circumstances, such transient MAC addresses can no longer allow device-specific long-term tracking of network activity by the telecommunications network. Instead, network activity is associated with a plurality of MAC addresses, and presumed to belong to a different network device, despite a single device in fact using said plurality of MAC addresses. As a result, the ability for a network operator to assist with network activity-informed customer services, such as technical support and fault rectification, and network configuration and optimisation, may be diminished or even prevented.

It is an aim of the present invention to at least alleviate some of the aforementioned problems.

STATEMENTS OF INVENTION

According to a first aspect of the present invention, there is provided: a method of operating a telecommunications network, said telecommunications network comprising a cellular telecommunications network and a non-cellular telecommunications network, wherein both of said networks are accessible to a User Equipment, UE, the method comprising the steps of: establishing a network connection between the UE and the cellular telecommunications network via the non-cellular telecommunications network; obtaining, by means of the cellular telecommunications network, a: unique cellular subscriber identity associated with the UE and for accessing the cellular telecommunications network; and network address associated with the UE and for use with the non-cellular telecommunications network for the network connection; generating an identifier for identifying the UE to the non-cellular telecommunications network; generating, by means of the cellular telecommunications network, a mapping between the: identifier; unique cellular subscriber identity; and the network address; and receiving, at the non-cellular telecommunications network, based on the generated mapping, the identifier in association with the network address.

Preferably, the UE is configured to use, over multiple different network connections, different network addresses, thereby using a plurality of network addresses, wherein each of said plurality is mapped to the identifier. Preferably, the method further comprises the step of using, by means of the non-cellular network, the identifier to identify the UE, and more preferably said use being the association of network activity using (or associated with) the obtained network address (or each of the plurality of network addresses) with the identifier, and therefore with the UE. Preferably, the identifier is fixed. Preferably, the mapping between the identifier and the unique cellular subscriber identity is a one-to-one mapping, and more preferably is fixed or static. Preferably, the mapping between the unique cellular subscriber and the network address of the UE is a one-to-one or a one-to-many mapping, and more preferably is dynamic or non-static.

According to another aspect of the invention, there is provided a method of operating a cellular telecommunications network, said network forming part of a telecommunications network, in turn also comprising a non-cellular telecommunications network, wherein both the cellular telecommunications network and the non-cellular telecommunications network are accessible to a User Equipment, UE, the method comprising the steps of: participating in establishing a network connection between the UE and the cellular telecommunications network via the non-cellular telecommunications network; obtaining a: unique cellular subscriber identity associated with the UE and for accessing the cellular telecommunications network; and network address associated with the UE and for use with the non-cellular telecommunications network for the network connection; generating an identifier for identifying the UE to the non-cellular telecommunications network; generating a mapping between the: identifier; unique cellular subscriber identity; and the network address; and sending to the non-cellular telecommunications network, based on the generated mapping, the identifier in association with the network address.

According to yet another aspect of the invention, there is provided a method of operating a non-cellular telecommunications network, said network forming part of a telecommunications network, in turn also comprising a cellular telecommunications network, wherein both the non-cellular telecommunications network and the cellular telecommunications network are accessible to a User Equipment, UE, the method comprising the steps of: participating in establishing a network connection between the UE and the cellular telecommunications network via the non-cellular telecommunications network; receiving an identifier generated by operation of the cellular telecommunications network according to the method described above; and using the identifier to associate network activity using the obtained network identifier with the identifier, and therefore with the UE.

Preferably, the network address comprises: a physical network address; a transport network address; and/or a fixed access line identifier. Preferably, the physical network address is a MAC address. Preferably, the physical network address is generated (and optionally, re-generated) by the UE in response to, or as a part of, establishing the network connection. Preferably, the UE is configured to modify its physical network address, and more preferably said modification is randomised. Preferably, the transport network address comprises an IP address and/or a port number, and more preferably is associated with a tunnel between the UE and the cellular telecommunications network for the network connection. Preferably, the transport network address and/or the fixed access line identifier is/are used to retrieve the physical network address from the non-cellular network. Preferably, the step of obtaining the network address comprises the cellular network requesting the network address, or a part thereof, from the non-cellular network.

Preferably, the identifier is a new identifier such that the new identifier is different to the unique cellular subscriber identity. Alternatively, the identifier may be the unique cellular subscriber identity. Preferably, the identifier is generated so as to anonymise the unique cellular subscriber identity.

Preferably, the identifier is unique. Preferably, the identifier is unique for all time, and more preferably is only ever associated with a single unique cellular subscriber identity.

Preferably, the network connection is a subsequent network connection and wherein the network address is a subsequent network address, the method comprising the further steps of: prior to establishing the subsequent network connection, establishing a previous network connection between the UE and the cellular telecommunications network via the non-cellular telecommunications network; for said previous network connection, identifying, by means of the cellular telecommunications network: the unique cellular subscriber identity; a previous network address associated with the UE and for use with the non-cellular telecommunications network for the previous network connection; after establishing the subsequent network connection, comparing the previous network address and the subsequent network address, wherein generating the identifier for the UE is performed in response to determining that said network addresses are different. Preferably, generating the identifier for the UE is only performed in response to determining that said network addresses are different.

Preferably, the unique cellular subscriber identity is withheld from the non-cellular network. Preferably, the generated mapping is stored in the cellular network, and more preferably only in the cellular network.

Preferably, the non-cellular network comprises an access point through which the network connection is established, and wherein the identifier in association with the network address is communicated by the non-cellular and/or the cellular network/s to the access point.

Preferably, the step of obtaining the, or at least part of the, network address comprises the step of the non-cellular and/or cellular network/s requesting said network address from the access point. Preferably, the access point is identified from the transport network address and/or the fixed access line identifier.

According to still another aspect of the invention, there is provided a computer-readable carrier medium comprising a computer program, which, when the computer program is executed by a computer, causes the computer to carry out the steps of any one of the methods described above.

According to still a further aspect of the present invention, there is provided a cellular telecommunications network comprising: a first network interface for communicating with a non-cellular telecommunications network; a second network interface for communicating with a User Equipment, UE, via the non-cellular telecommunications network; and a processor configured to: participate in establishing a network connection between the UE and the cellular telecommunications network via the non-cellular telecommunications network; obtain a: unique cellular subscriber identity, associated with the UE, for accessing the cellular telecommunications network; network address associated with the UE and for use with the non-cellular telecommunications network for the network connection; generate an identifier for identifying the UE to the non-cellular telecommunications network; generate a mapping between the: identifier; unique cellular subscriber identity; and the network address; and communicate, to the non-cellular telecommunications network via the first network interface, based on the generated mapping, the identifier, thereby to permit the non-cellular telecommunications network to associate the network address with the identifier. Preferably, the telecommunications network is a converged network or a hybrid, multi-access telecommunications network. Preferably, the cellular telecommunications network is a 3GPP telecommunications network, and more preferably operates as a 5G telecommunications network. Preferably, the non-cellular telecommunications network comprises a non-3GPP telecommunications network. Preferably, the non-cellular telecommunications network comprises a wireless local area network and a wide area fixed access telecommunications network. The non-cellular telecommunications network and the cellular telecommunications network may be operated by the same or by different entities.

According to yet a further aspect of the present invention, there is provided a non-cellular telecommunications network, said network forming part of a telecommunications network, in turn also comprising a cellular telecommunications network as described above, wherein both the non-cellular telecommunications network and the cellular telecommunications network are accessible to a User Equipment, UE, the non-cellular telecommunications network comprising: a receiver for receiving the identifier generated by the cellular telecommunications network; and a controller configured to: participate in establishing a network connection between the UE and the cellular telecommunications network via the non-cellular telecommunications network; and use the identifier to associate network activity using the obtained network identifier with the identifier, and therefore with the UE.

According to another aspect of the present invention, there is provided a telecommunications network comprising: a cellular telecommunications network as described above; and a non-cellular telecommunications network as described above.

BRIEF DESCRIPTION OF THE DRAWINGS

The invention extends to methods and telecommunications networks as described herein and/or substantially as illustrated with reference to the accompanying drawings. The present invention is now described, purely by way of example, with reference to the accompanying diagrammatic drawings, in which:

FIG. 2 shows an exemplary process of operating the telecommunications network.

SPECIFIC DESCRIPTION

Figure 1:
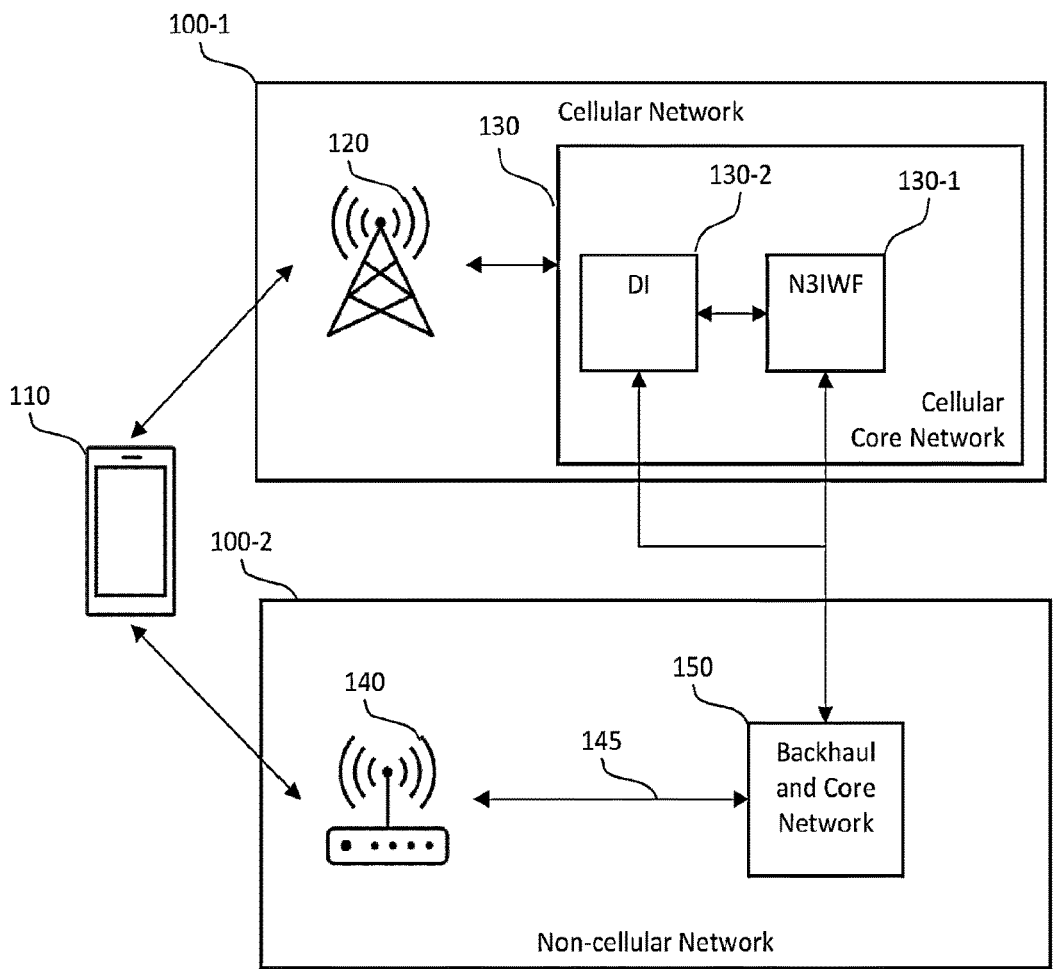
FIG. 1 shows a schematic diagram of an exemplary telecommunications network.

FIG. 1 shows a telecommunications network 100 comprising: a cellular telecommunications network 100-1; a non-cellular telecommunications network 100-2; and User Equipment (UE) 110.

The cellular (or "mobile") network 100-1 is in the form of a 5$^{th}$ Generation (5G) network, and comprises a radio access network 120 and a cellular core network 130, which are communicatively coupled. The core network 130 in turn comprises a: Non-3GPP Interworking Function (N3IWF) 130-1; and Device Identifier (DI) function 130-2.

The non-cellular telecommunications network 100-2 comprises an access point 140 and a non-cellular backhaul and core network 150, which respectively provide a local area network (in particular, a wireless network, e.g. using Wi-Fi®) and a wide-area fixed-access broadband network. The access point 140 and the non-cellular backhaul and core network 150 are interconnected by means of a line connection 145 that is identifiable to the non-cellular network by a unique line ID (e.g. a landline telephone number).

The UE 110 is configured to access both the cellular and the non-cellular networks via the radio access network 120 and the access point 140, respectively. Accordingly, for cellular network access, the UE is assigned a cellular subscriber identity (e.g. International Mobile Subscriber Identity, IMSI) that uniquely (and, effectively, immutably) identifies the UE to the cellular network 100-1.

It will be appreciated that the cellular 100-1 and non-cellular 100-2 networks, and in particular the cellular core network 130, comprise further components that have been omitted for brevity from FIG. 1 and the description, but which are readily known in the art, and in particular as disclosed in standards provided by IEEE® and 3GPP®.

Using a principle of network convergence, the UE 110 is also available to access the cellular core network 130 via the non-cellular network 100-2 using network addresses associated with the UE and the cellular subscriber identity.

The access point 140, which helps facilitates such network convergence, is in the form of a Residential Gateway (RG), which is available to communicate with the N3IWF 130-1, via the line connection 145 and the backhaul and core network 150. In one example, the RG is in the form of a non-3GPP access point. The RG is available to facilitate hybrid access, and/or is available to be in the form of an untrusted or a trusted access point.

To communicate with the access point 140, the UE uses a Media Access Control (MAC) address associated therewith. However, the UE 110 is configured to modify its MAC address so as to limit tracking when accessing the non-cellular network, for example by means of "MAC randomisation". Prior to operation of the process described herein, the access point 140 may, when only using MAC addresses (as is conventional), therefore misidentify the single UE 110 as a different UE with every change of MAC address. In turn, an operator of the non-cellular network 100-2, when using identity information from the access point 140, may also misidentify the UE 110 in the same way.

For the UE 110 to access the N3IWF, a tunnel is established between the UE 110 and the N3IWF 130-1, via the access point 140, the line connection 145 and the non-cellular backhaul and core network 150. To establish the tunnel, the N3IWF retrieves: network addresses associated with the UE, including an IP address and a port number (as allocated by the backhaul and core network 150 and the access point 140, respectively); and the cellular subscriber identity of the UE.

The DI 130-2 comprises: an interface for the N3IWF 130-1; an interface for the backhaul and core network 150; a database (not shown); and a processor (not shown).

Accordingly, the DI 130-2 is configured to receive, from the:
1. N3IWF 130-1, as is already available to the N3IWF as part of the establishment of the tunnel, the:
   a. IP address and port number for the tunnel; and
   b. cellular subscriber identity of the UE;
2. backhaul and core network 150, the unique line ID for the tunnel, based on the IP address; and
3. access point 140, via the backhaul and core network 150, the MAC address associated with the UE, based on the unique line ID, the IP address and the port number.

The processor of the DI is configured to generate a fixed new identifier for the UE. The fixed new identifier is stored in the database in association with the IP address and the port number for the tunnel, and the cellular subscriber identity and the MAC address of the UE.

The new identifier is new in that it is different to at least the cellular subscriber identity. In particular, the new identifier anonymises the cellular subscriber identity. Furthermore, the new identifier is static and is associated with only a single cellular subscriber identity.

As described in more detail below, despite the UE changing its MAC address, the telecommunications network 100 is configured to maintain continuity of identity of the UE, over different MAC addresses, using the new identifier. FIG. 2 shows a flow diagram of a process 200 by which the telecommunications network 100 is operated to help achieve this end.

At a first step 210, the UE 110 establishes a network connection with the cellular telecommunications network 100-1 via the non-cellular telecommunications network 100-2, by establishing the tunnel from the UE 110 to the N3IWF 130-1.

At a next step 220, the N3IWF receives the IP address and port number of the tunnel. Furthermore, as part of an authentication process by the cellular network (e.g. as performed by an Authentication, Authorization and Accounting, AAA, function, not shown), the N3IWF receives the cellular subscriber identity of the UE. The IP address, port number and cellular subscriber identity are then communicated from the N3IWF to the DI 130-2, and are then stored in the database of the DI in association with one-another.

The DI 130-2 also receives the MAC address that is determined to be associated with the UE. Typically, the MAC address of the UE is only known to, and stored by, the access point 140. Accordingly, in one example, the DI communicates the IP address and port number associated with the tunnel to the backhaul and core network 150, which allows the unique line ID to be identified. In turn, the unique line ID allows the backhaul and core network 150 to identify the access point 140. The backhaul and core network 150 then requests and receives, from the identified access point 140, the MAC address currently associated with the communicated IP address and port number. Finally, the requested MAC address is communicated to the DI in association with the originally-communicated IP address and port number. The MAC address is then stored in the database of the DI, in association with the IP address and port number.

Next, the DI 130-2 generates the new identifier for the UE, which is stored in the database in association with the cellular subscriber identity, and therefore also the MAC address 230.

The DI then communicates to the backhaul and core network 150 (and/or access point 140), in association with one another, the new identifier and the MAC address. The cellular subscriber identity is withheld from the non-cellular network.

In this way, the non-cellular telecommunications network has, as the new identifier, a fixed identity for the UE that permits permanency of identity for the UE despite changes to the MAC address of (and, optionally, the IP and/or port number associated with) the UE, given that the new identifier is ultimately anchored to the cellular subscriber identity.

Accordingly, the non-cellular telecommunications network (specifically, the backhaul and core network 150 and/or access point 140) is available to associate network activity with the new identifier, rather than with a MAC address that may have no permanent association with a specific UE. As a result, the non-cellular telecommunications network may accumulate more complete knowledge of network performance and faults associated with a UE using the non-cellular telecommunications network.

Access to the cellular network via the non-cellular network merely provides a mechanism by which the cellular subscriber identity of the UE may be discovered and associated with a MAC address currently being used by the UE. Accordingly, it will be appreciated that the benefit of being able to identify the UE using said currently-used MAC address will persist even if the UE subsequently accesses, only and directly, the non-cellular network.

Alternatives and Modifications

In an alternative, the step of generating the new identifier for the UE 230, and subsequently using said new identifier, is only performed in response to the DI 130-2 identifying that the UE 110 has modified its MAC address; this may be determined by comparing, over multiple network connections to the cellular network via the non-cellular network, use of different MAC addresses by the same cellular subscriber identity (i.e. as per a comparison of the results of multiple iterations of steps 210 and 220).

In an alternative, instead of associating the MAC address with the cellular subscriber identifier and the new identifier 230, only the IP address and port number associated with the UE, for a given unique line ID, are linked with the cellular subscriber identifier and the new identifier 230. As such, continuity of identity of the UE may be achieved despite changes to the IP address and port number associated with the UE across multiple connections, and without having to retrieve the MAC address.

In an alternative example, the DI 130-2 is in communication with the backhaul and core network 150 via the N3IWF 130-1.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a telecommunications network, said telecommunications network comprising a cellular telecommunications network and a non-cellular telecommunications network, wherein both of said networks are accessible to a User Equipment, UE, the method comprising the steps of:

establishing a network connection between the UE and the cellular telecommunications network via the non-cellular telecommunications network;

obtaining, by means of the cellular telecommunications network, a:

unique cellular subscriber identity associated with the UE and for accessing the cellular telecommunications network; and network address associated with the UE and for use with the non-cellular telecommunications network for the network connection;

generating an identifier for identifying the UE to the non-cellular telecommunications network;

generating, by means of the cellular telecommunications network, a mapping between the: identifier; unique cellular subscriber identity; and the network address; and receiving, at the non-cellular telecommunications network, based on the generated mapping, the identifier in association with the network address.

2. A method of operating a cellular telecommunications network, said network forming part of a telecommunications network, in turn also comprising a non-cellular telecommunications network, wherein both the cellular telecommunications network and the non-cellular telecommunications network are accessible to a User Equipment, UE, the method comprising the steps of:

participating in establishing a network connection between the UE and the cellular telecommunications network via the non-cellular telecommunications network;

obtaining a:

unique cellular subscriber identity associated with the UE and for accessing the cellular telecommunications network; and network address associated with the UE and for use with the non-cellular telecommunications network for the network connection;

generating an identifier for identifying the UE to the non-cellular telecommunications network;

generating a mapping between the: identifier; unique cellular subscriber identity; and the network address; and sending to the non-cellular telecommunications network, based on the generated mapping, the identifier in association with the network address.

3. A method of operating a non-cellular telecommunications network, said network forming part of a telecommunications network, in turn also comprising a cellular telecommunications network, wherein both the non-cellular telecommunications network and the cellular telecommunications network are accessible to a User Equipment, UE, the method comprising the steps of:

participating in establishing a network connection between the UE and the cellular telecommunications network via the non-cellular telecommunications network;

receiving an identifier generated by operation of the cellular telecommunications network according to the method of claim 2; and using the identifier to associate network activity using the obtained network identifier with the identifier, and therefore with the UE.

4. A method according to claim 1, wherein the network address comprises: a physical network address; a transport network address; and/or a fixed access line identifier.

5. A method according to claim 1, wherein the identifier is a new identifier such that the new identifier is different to the unique cellular subscriber identity.

6. A method according to claim 1, wherein the identifier is unique.

7. A method according to claim 1, wherein the network connection is a subsequent network connection and wherein the network address is a subsequent network address, the method comprising the further steps of:

prior to establishing the subsequent network connection, establishing a previous network connection between the UE and the cellular telecommunications network via the non-cellular telecommunications network;

for said previous network connection, identifying, by means of the cellular telecommunications network:

the unique cellular subscriber identity;

a previous network address associated with the UE and for use with the non-cellular telecommunications network for the previous network connection;

after establishing the subsequent network connection, comparing the previous network address and the subsequent network address, wherein generating the identifier for the UE is performed in response to determining that said network addresses are different.

8. A method according to claim 1, wherein the unique cellular subscriber identity is withheld from the non-cellular telecommunications network.

9. A method according to claim 1, wherein the non-cellular telecommunications network comprises an access point through which the network connection is established, and wherein the identifier in association with the network address is communicated by the non-cellular and/or the cellular telecommunications network/s to the access point.

10. A method according to claim 9, wherein the step of obtaining the, or at least part of the, network address comprises the step of the non-cellular and/or cellular telecommunications network/s requesting said network address from the access point.

11. A non-transitory computer-readable carrier medium comprising a computer program, which, when the computer program is executed by a computer, causes the computer to carry out the steps of claim 1.

12. A cellular telecommunications network comprising:

a first network interface for communicating with a non-cellular telecommunications network;

a second network interface for communicating with a User Equipment, UE, via the non-cellular telecommunications network; and a processor configured to:

participate in establishing a network connection between the UE and the cellular telecommunications network via the non-cellular telecommunications network;

obtain a:

unique cellular subscriber identity, associated with the UE, for accessing the cellular telecommunications network;

network address associated with the UE and for use with the non-cellular telecommunications network for the network connection;

generate an identifier for identifying the UE to the non-cellular telecommunications network;

generate a mapping between the: identifier; unique cellular subscriber identity; and the network address; and communicate, to the non-cellular telecommunications network via the first network interface, based on the generated mapping, the identifier, thereby to permit the non-cellular telecommunications network to associate the network address with the identifier.

13. A non-cellular telecommunications network, said network forming part of a telecommunications network, in turn also comprising a cellular telecommunications network according to claim 12, wherein both the non-cellular telecommunications network and the cellular telecommunications network are accessible to a User Equipment, UE, the non-cellular telecommunications network comprising:

a receiver for receiving the identifier generated by the cellular telecommunications network; and a controller configured to:

participate in establishing a network connection between the UE and the cellular telecommunications network via the non-cellular telecommunications network; and use the identifier to associate network activity using the obtained network identifier with the identifier, and therefore with the UE.

14. A telecommunications network comprising:

a cellular telecommunications network according to claim 12; and a non-cellular telecommunications network.

15. A method according to claim 1, wherein:

the network address associated with the UE and obtained by means of the cellular telecommunications network is a Media Access Control (MAC) address associated with the UE;

the method further comprises communicating, from the cellular telecommunications network to the non-cellular telecommunications network, an IP address and a port number associated with a tunnel between the UE and the cellular telecommunications network; and the MAC address is associated with the communicated IP address and port number.

16. A method according to claim 2, wherein:

the network address associated with the UE and obtained by means of the cellular telecommunications network is a Media Access Control (MAC) address associated with the UE;

the method further comprises communicating, from the cellular telecommunications network to the non-cellular telecommunications network, an IP address and a port number associated with a tunnel between the UE and the cellular telecommunications network; and the MAC address is associated with the communicated IP address and port number.

17. A cellular telecommunications network according to claim 12, wherein:

the network address associated with the UE is a Media Access Control (MAC) address associated with the UE;

the processor is further configured to communicate, from the cellular telecommunications network to the non-cellular telecommunications network, an IP address and a port number associated with a tunnel between the UE and the cellular telecommunications network; and the MAC address is associated with the communicated IP address and port number.

* * * * *